United States Patent [19]

Sealey et al.

[11] Patent Number: 5,115,553

[45] Date of Patent: May 26, 1992

[54] CONTACT LENS MANUFACTURING APPARATUS

[75] Inventors: Michael J. Sealey; Albert H. Morland, both of Southampton, United Kingdom

[73] Assignee: The Cooper Companies, Inc., Menlo Park, Calif.

[21] Appl. No.: 94,160

[22] Filed: Sep. 1, 1987

Related U.S. Application Data

[60] Division of Ser. No. 24,927, Mar. 27, 1987, Pat. No. 4,745,672, which is a continuation of Ser. No. 589,061, filed as PCT/GB83/00137, May 13, 1983, abandoned.

[30] Foreign Application Priority Data

May 15, 1982 [GB] United Kingdom ............... 82 14045

[51] Int. Cl.$^5$ ..................... B23Q 7/00; B23P 23/00
[52] U.S. Cl. ........................ 29/563; 29/564; 29/27 C; 29/33 P; 29/712; 29/809; 29/822; 414/222; 414/225
[58] Field of Search ................ 221/294, 822; 29/809, 29/33 P, 27 C, 563, 564, 712; 414/126, 131, 788.7, 222, 225; 82/2.5, 2.7; 51/101 LG, 105 LG, 216 LP

[56] References Cited

U.S. PATENT DOCUMENTS

| 1,862,042 | 6/1932 | Stevens . | |
| 2,570,660 | 10/1951 | Gamble | 82/2.7 |
| 2,666,255 | 1/1954 | McCoy et al. | 414/126 |
| 3,064,531 | 11/1962 | Bullock | 88/54.5 |
| 3,239,079 | 3/1966 | Leavesley, Jr. et al. | 414/225 |
| 3,301,105 | 1/1967 | Morris | 82/14 |
| 3,360,100 | 12/1967 | Seragnoli | 198/24 |
| 3,423,886 | 1/1969 | Schpak et al. | 51/281 |
| 3,507,403 | 4/1970 | Moore et al. | 214/1 |
| 3,552,062 | 1/1971 | Brown | 82/2.7 |
| 3,630,111 | 12/1971 | Hartford et al. | 82/15 |
| 3,704,558 | 12/1972 | Sarofeen | 51/216 LP |
| 3,738,204 | 6/1973 | Spriggs | 82/1 |
| 3,763,597 | 10/1973 | Schlotfeldt | 51/33 |
| 3,823,836 | 7/1974 | Cheney et al. | 414/225 |
| 3,914,853 | 10/1975 | Jauch | 29/563 |
| 4,002,247 | 1/1977 | Dixon | 214/1 |
| 4,035,904 | 7/1977 | Ishizaka et al. | 29/563 |
| 4,061,062 | 12/1977 | Peltier | 82/2.7 |
| 4,072,476 | 2/1978 | Kulson | 51/215 |
| 4,084,458 | 4/1978 | Galley | 81/1 |
| 4,090,287 | 5/1978 | Selander | 29/568 |
| 4,162,641 | 7/1979 | Stubbings | 414/788.7 |
| 4,210,038 | 7/1980 | Hill | 82/11 |
| 4,267,672 | 5/1981 | Sorrells | 51/216 LP |
| 4,415,301 | 11/1983 | Zielke | 414/788.7 |
| 4,541,762 | 9/1985 | Tischler et al. | 414/32 |
| 4,677,729 | 7/1987 | Morland et al. | 29/426.5 |
| 4,745,672 | 5/1988 | Sealey et al. . | |

FOREIGN PATENT DOCUMENTS

| 346924 | 1/1922 | Fed. Rep. of Germany . |
| 1237005 | 3/1067 | Fed. Rep. of Germany . |
| 2705376 | 8/1978 | Fed. Rep. of Germany . |
| 844220 | 7/1981 | U.S.S.R. . |
| 927326 | 5/1963 | United Kingdom . |
| 1156455 | 6/1969 | United Kingdom . |
| 1343301 | 1/1974 | United Kingdom . |
| 1352513 | 5/1974 | United Kingdom . |
| 1488001 | 10/1977 | United Kingdom . |

OTHER PUBLICATIONS

Walker, "Loading on the Fly Speeds Internal Grinding", Machinery, vol. 72, No. 5, (Jan., 1966), p. 137.
Walker, H., "Magazine und Zubringe-Einrichtungen für Einspindel-Drehautomaten", Werkstattstechnik, vol. 56, No. 10, Oct. 1966, pp. 481–486.

*Primary Examiner*—Bruce Y. Arnold
*Assistant Examiner*—R. D. Shafer
*Attorney, Agent, or Firm*—Vorys, Sater, Seymour & Pease

[57] ABSTRACT

Apparatus for feeding workpieces (37, 38) to the collet (3) of a lens lathe comprises a loading device (12) and a magazine (10) for containing a plurality of workpieces (37, 38). The magazine (10) has an opening (11) at one end through which the workpieces (37, 38) are sequentially removable. The loading device (12) is arranged to accept workpieces (37, 38) sequentially from the magazine (10) at a loading station, and to feed them to the collet (3). The loading device (12) has a pair of star wheels (16) for holding a workpiece (37, 38) removed from the magazine (10), and means (34, 35, 36) for positioning said workpiece at the loading station in a predetermined position with respect to the collet (3). The loading device (12) has piston-and-cylinder devices (20) and (23) for moving the star wheels (16) so as to carry said workpiece (37, 38) from the loading station to the collet (3).

14 Claims, 6 Drawing Sheets

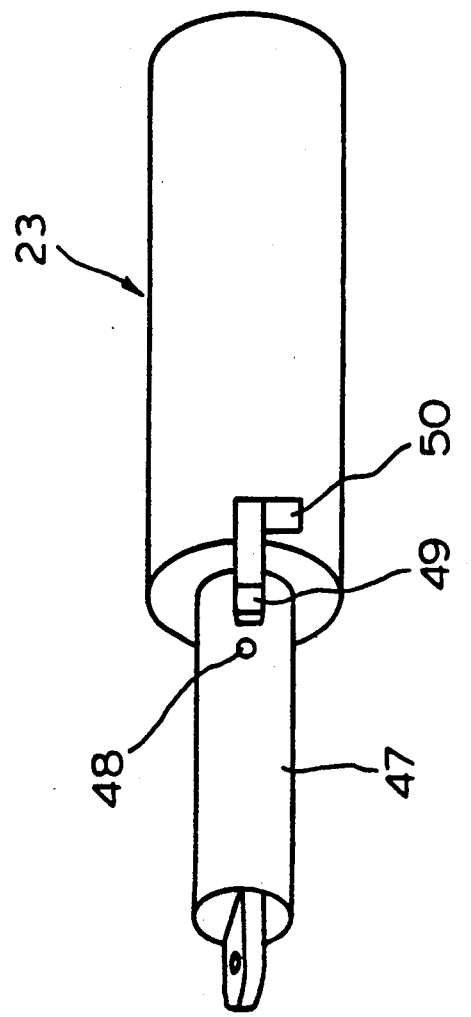
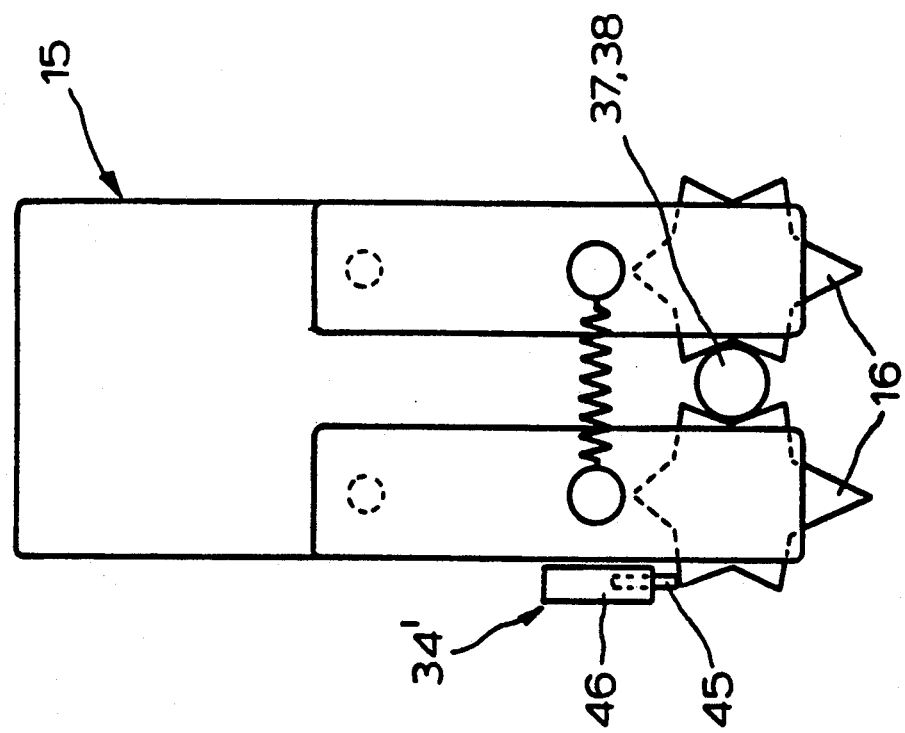

CONTACT LENS MANUFACTURING APPARATUS

This application is a divisional of application Ser. No. 07/024,927 filed Mar. 27, 1987 which is now U.S. Pat. No. 4,745,672 issued May 24, 1988 and which is a continuation application of Ser. No. 06/589,061 filed as PCT/GB83/00137, May 13, 1983 which is now abandoned.

This invention relates to a method of, and apparatus for manufacturing contact lenses.

The most commercially important method of manufacturing contact lenses at present is by machining from suitably sized lens blanks. Although the lens blanks are commonly machined on automatic or semi-automatic lathes, the manufacturing process is necessarily somewhat laborious, since the lens blanks have to be loaded by hand into the lathe collect, and unloaded by hand after the sequence of machining operations has been completed. A typical machining method and lens manufacturing apparatus are described in British Patent Specification No. 1,488,001. There is consequently a need for a method of automatically loading workpieces, such as contact lens blanks to a machine tool, and for apparatus suitable for this operation.

Furthermore the manufacture of contact lenses involves a series of operations in which the lens surfaces are polished after lathe cutting steps in which the base and power curves are formed and the finished lenses are then inspected for quality and adherence to specification. These operations are difficult to carry out accurately and repetitively since, according to conventional procedures, each lens is handled individually.

According to one aspect of the present invention, there is provided a method of machining workpieces, especially contact lens blanks, the method comprising the steps of feeding the workpieces sequentially from a magazine to a loading station, at which each workpiece is positioned accurately in a predetermined location with respect to a machine tool collet, transferring each of the workpieces from the loading station to the collet, and machining a surface on each of the workpieces.

The invention also provides apparatus for feeding workpieces to a machine tool collet, the apparatus comprising a loading device and a magazine for containing a plurality of workpieces, the magazine having an opening at one end through which the workpieces are sequentially removable, the loading device being arranged to accept workpieces sequentially from the magazine at a loading station and to feed them to the collet of a machine tool, the loading device having means for holding a workpiece removed from the magazine and means for positioning said workpiece at the loading station in a predetermined position with respect to the collet, and the loading device having a mechanism for moving the holding means so as to carry said workpiece from the loading station to the machine tool collet.

By designing a magazine for the lens blanks and providing similar loading and unloading devices on each of the machines employed for the different stages of lens manufacture, the magazines containing lens blanks or partly worked blanks can readily be taken from one machine to the next, with the minimum of handling. Higher productivity with greater accuracy and repeatability can thereby be achieved.

Thus, although the loading and unloading devices using a magazine will be described in greater detail as applied to the automatic feeding of lens blanks to a lens lathe, and for removing the machined workpieces after the machining operation, the loading and unloading system described herein is applicable to other operations in the manufacture of lenses for example, feeding lenses or partly-worked blanks to a polishing machine. However, in the case of feeding blanks to a lathe there is normally a need for precise determination of the position of a workpiece with respect to the collet, while feeding of lenses to polishing machines does not require the same degree of accurate positioning of the lenses.

Advantageously, the loading device has a carriage which supports the holding means, and the carriage is movable by at least one piston-and-cylinder device. Preferably, the carriage is movable by first and second piston-and-cylinder devices, the first and second piston-and-cylinder devices being jointly effective to move the holding means from the loading station into a position in which said workpiece is in alignment with the collet, the first piston-and-cylinder device being effective to move the holding means so as to carry said workpiece from said position to the machine tool collet, and the second piston-and-cylinder device being effective to move the holding means away from the collet after said workpiece has been transferred to the collet. Conveniently, the piston-and-cylinder devices are arranged substantially at right-angles, and wherein the carriage is provided with a cam which is movable along a cam surface for guiding the holding means from the loading station to the collet.

In a preferred embodiment, the piston-and-cylinder devices are controlled by first and second proximity switches, the first proximity switch initiating the movement of the holding means which carries said workpiece from said position towards the collet, and the second proximity switch initiating movement of the holding means away from the collet after said workpiece has been transferred to the collet.

In another preferred embodiment, each of the piston-and-cylinder devices has a magnet associated with its piston rod and a sensor assoicated with its cylinder, the magnets and sensors being so positioned that, when the sensor of the second piston-and-cylinder device is in alignment with the magnet of that device, it initiates the movement of the holding means which carries said workpiece from said position towards the collet, and, when the sensor of the first piston-and-cylinder device is in alignment with the magnet of that device, it initiates the movement of the holding means away from the collet after said workpiece has been transferred to the collet.

Preferably, the apparatus further comprises a delay switch which delays actuation of the first piston-and-cylinder device for a predetermined time after the actuation of the second piston-and-cylinder device at the start of the movement of the holding means from the loading station to said position.

Advantageously, the holding means comprises a pair of star wheels. Preferably, each of the star wheels is rotatably mounted on the loading device by means of a respective one-way clutch, the star wheels being arranged to grip generally cylindrical workpieces as they are released from the magazine.

In a preferred embodiment, the positioning means is constituted by a positioning lever mounted on the loading device, the positioning lever having a gauging surface arranged to contact a surface of a workpiece, and thereby to position the workpiece accurately in a predetermined location for engagement by the star wheels.

In another preferred embodiment, the positioning means is constituted by a device having a stop pin which is arranged to contact one of the side faces of one of the star wheels, and thereby to position a workpiece accurately in a predetermined location between the star wheels. Conveniently, the positioning device is fixed with respect to the magazine. Advantageously, the stop pin is resiliently mounted within the positioning device.

The apparatus may further comprise an unloading device arranged to accept workpieces sequentially from the collet, and for moving the workpieces away from the collet. Preferably, the unloading device is identical with the loading device except that it is not provided with positioning means. In this case, the one-way clutches of the unloading device permit rotation of the star wheels of the unloading device in directions opposite to those in which the one-way clutches of the loading device permit rotation of the equivalent star wheels of the loading device.

The invention also provides a lens lathe comprising a head stock, a collet rotatably mounted in the head stock, and apparatus for feeding workpieces to the collet, the feeding apparatus being as defined above.

The invention further provides a magazine for use with the feeding apparatus defined above, the magazine being adapted to contain a plurality of workpieces, and having an opening at one end through which the workpieces are sequentially removable, the magazine being provided with a releasable locking device adjacent said one end, the locking device being engageable with the workpiece nearest said one end and being releasable therefrom to permit that workpiece to pass through said opening, wherein the locking device comprises a locking member provided with a projection, the projection being in alignment with, and passable through, an aperture provided in the magazine adjacent said one end, and the free end of the projection being engageable with said workpiece.

Advantageously, the locking member is mounted on a pivotal lever which is spring biased so as to force the projection through said aperture and into engagement with said workpiece. Preferably, the lever is engageable by means of a cam surface provided on the loading device of the feeding apparatus for pivoting the lever against the biasing force of the spring, thereby releasing said workpiece from the magazine.

Embodiments of the invention will now be described, by way of example, with reference to the accompanying drawings, in which:

FIG. 6 is a view similar to that of FIG. 5, but showing a modified arrangement;

FIG. 7 is a perspective view of a modified form of piston-and-cylinder device suitable for use with the loading device of FIG. 2;

Figure 1:
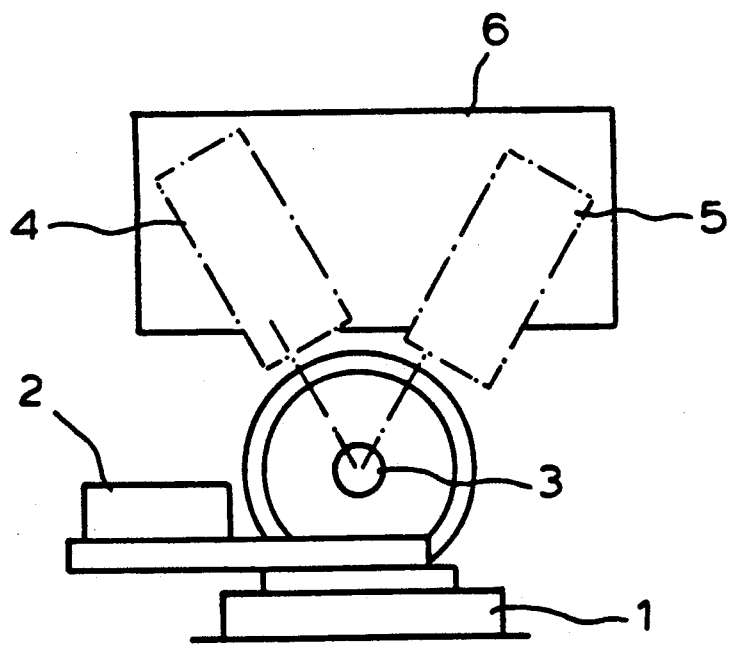
FIG. 1 is a diagrammatic elevational view of a lens lathe fitted with automatic loading and unloading devices constructed in accordance with the invention.

Referring to the drawings, FIG. 1 shows a lens lathe similar to that described in British Patent Specification No. 1,488,001. The lathe comprises a turntable 1, on which tool holders (such as 2) are mounted for machining a workpiece held in the collet 3 of the lathe. The collet 3 is rotatably mounted by an air bearing in the head stock (not shown) of the lathe. A loader, indicated generally by the reference numeral 4, and an unloader, indicated generally by the reference numeral 5, are both mounted on a plate 6. The plate 6 is hinged to the lathe so as to be pivotable away from the lathe to facilitate replacement and setting of the tools.

Figure 2:
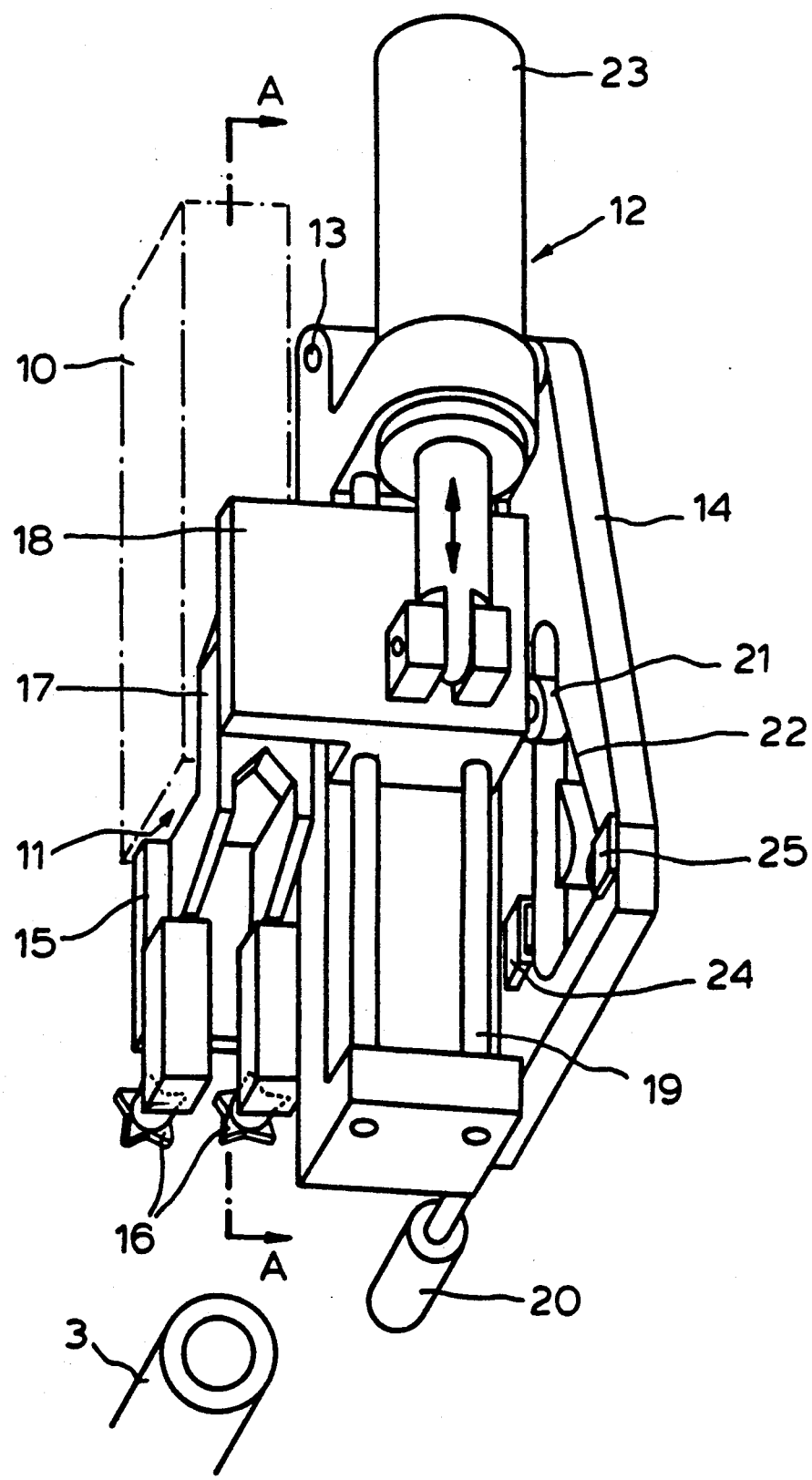
FIG. 2 is a perspective view of the loading device of FIG. 1.

The construction of the loader 4 is shown in FIGS. 2 to 5. Referring to FIG. 2, the workpieces are held in a magazine 10, which is releasably held by means (not shown) on the plate 6. The workpieces are removable sequentially from one end 11 of the magazine 10 by means of a loading device 12. The loading device 12 is pivotably mounted by a shaft 13 on a plate 14 which is secured to the back plate 6. The loading device 12 is provided with a loading head 15. A pair of star wheels 16 are mounted on the loading head 15, the star wheels being arranged to grip the workpieces in a manner which will be described later. Each of the star wheels 16 has five points, though it would be possible to use, for example, four-pointed star wheels or six-pointed star wheels. The loading head 15 is carried by a fork 17. The fork 17 is attached to a carriage 18, which is mounted for movement in an upward or downward direction on a slide 19. A fluid-operated piston-and-cylinder device 20 is connected to the slide 19, and is capable of pivoting the assembly comprising the slide 19 and the loading head 15 about the shaft 13 under the control of a cam 21 and a cam surface 22. A piston-and-cylinder device 23 provides the power for moving the carriage 18 upwardly and downwardly on the slide 19. Proximity switches 24 and 25 are located adjacent to the cam surface 22 for control purposes which will become clear later. The collet 3 of the lathe is shown diagramatically in FIG. 2.

Figure 3:
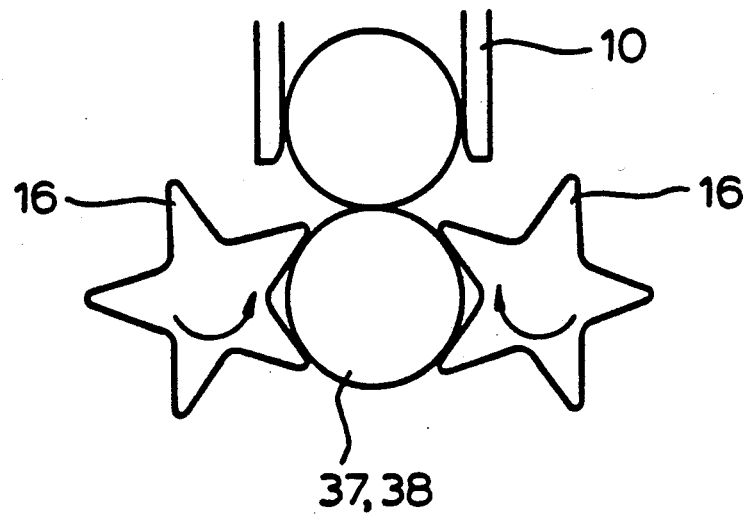
FIG. 3 is an enlarged view of part of the loading device of FIG. 2, and shows a pair of star wheels forming part of the loading device.
Figure 5:
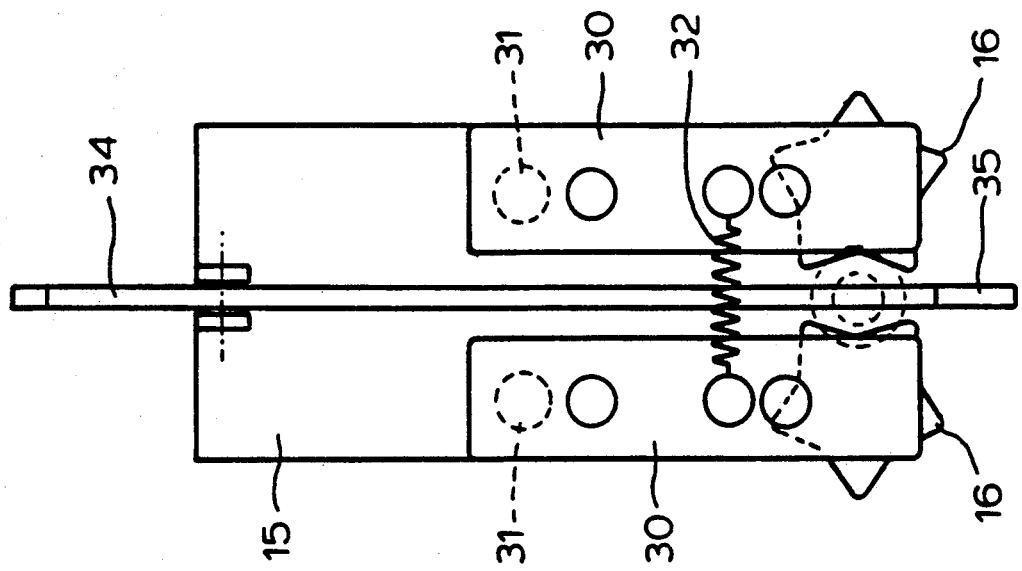
FIG. 5 is a view taken in the direction of the arrow X shown in FIG. 4.
Figure 4:
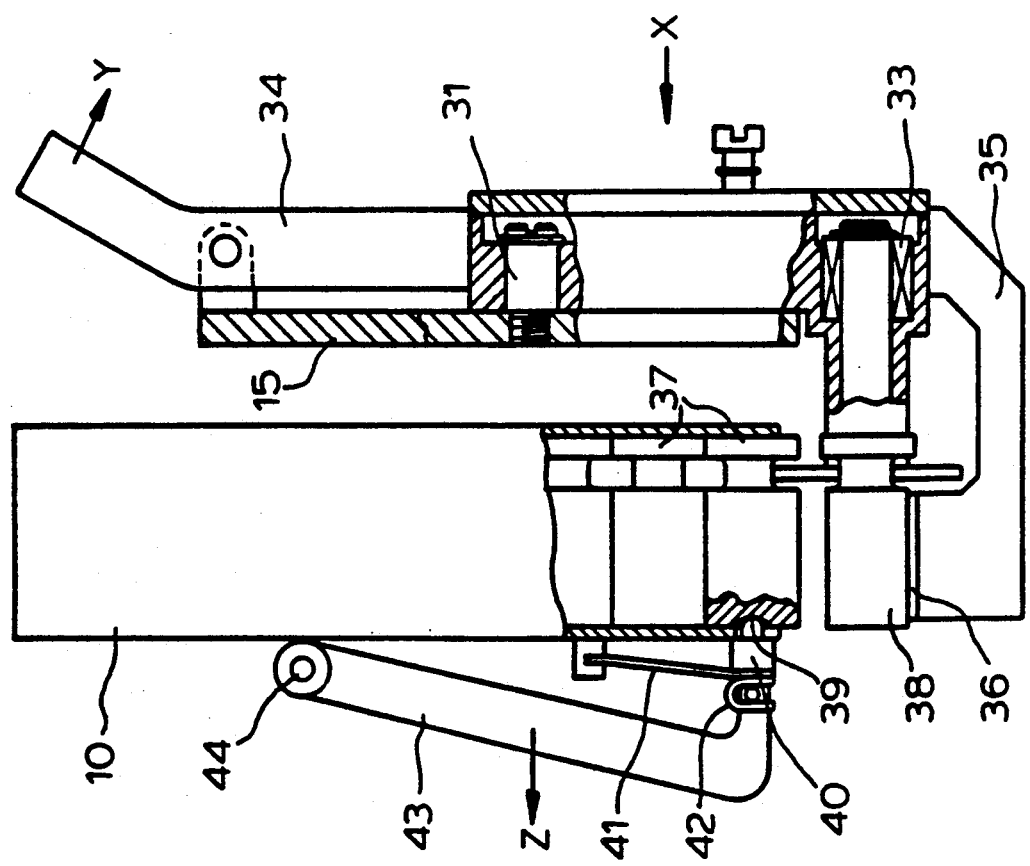
FIG. 4 is a part-sectional elevation taken on the line A—A of FIG. 2.

The construction of the loading head 15, and the manner in which the workpieces are removed from the magazine, is shown more clearly in FIGS. 3, 4 and 5. Referring to FIGS. 4 and 5, the loading head 15 comprises a pair of assemblies consisting of star wheel support plates 30, which are pivotably mounted on shafts 31, and are biased towards each other by a spring 32. The star wheels 16 are mounted on their respective support plates 30 by one-way (free-wheel) clutches 33 such as Torrington clutches. The star wheels 16 are free to rotate in the directions shown by the arrows in FIG. 3. A positioning lever 34 is pivotably mounted on the loading head 15 (or on the carriage 18), and is spring biased in the direction indicated by the arrow Y in FIG. 4. The lever 34 is provided with an arm 35 having an accurately-machined gauging or feeler surface 36. The position of the surface 36 is set so as to predetermine accurately the position of a workpiece at the beginning of the loading cycle.

Figure 8:
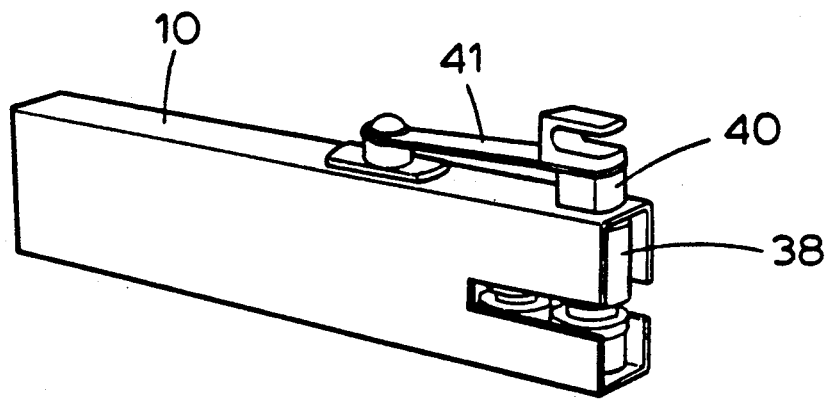
FIG. 8 is a perspective view of the magazine.
Figure 9A:
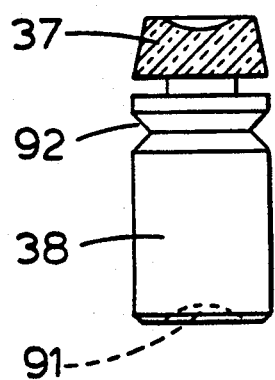
FIGS. 9A, 9B, 9C and 9D are elevations of chucks and blocks showing the shapes of the machined lens at different stages in its production.

The magazine 10 is loaded with workpieces, each of which is constituted by a lens blank 37 mounted on a metal chuck 38 (see FIGS. 4, 8 and 9A). The magazine has a tubular casing of rectangular cross-section and conveniently holds about ten workpieces. The housing may be closed at one end and open at the other but preferably is open at both ends but has a stop or a depression formed in the wall of the housing at the end opposite from which the chucks are removed. Conveniently the housing is extruded from a tough plastics material, such as p.v.c. The chucks 38 each have an accurately-machined surface for contacting the gauge surface 36 of the lever 34. The chuck 38 nearest to the open end 11 of the magazine 10 is held in place by a projection 39. The projection 39 has a spherical surface which projects through a slot (or a hole) in the wall of the magazine 10, and engages in a similarly shaped recess 91 (shown in dotted lines in FIG. 9A) in the end of the chuck 38. The projection 39 is mounted on a block 40, which is biased into engagement with the recess in the chuck 38 by a spring 41. The block 40 is connected to a hook 42 engaged by a pin at the end of a lever 43. The lever 43 is pivoted about a shaft 44 and is operated by a cam surface (not shown) on the loading device 12. This cam surface is arranged, at the appropriate time, to pivot the lever 43 in the direction of the arrow Z, thereby releasing the workpiece from the magazine 10.

FIG. 9A shows a chuck 38 and lens blank 37 in greater detail. As can be seen, the chuck 38 is formed with an annular groove 92 which is engageable by the star wheels of the loading and unloading devices. Lens blank 37 is bonded to the chuck by means of a thermoplastic adhesive, such as a wax adhesive, so that the partly machined blank can be removed at a later stage by raising the temperature of the chuck.

The unloader 5 is identical to the loader 4, except that its star wheels are mounted on its support plates by one-way clutches which permit free rotation of the star wheels in the directions opposite to those shown by the arrows in FIG. 3. Moreover, as the unloader 5 does not need to position the workpieces, it is not provided with a positioning arm 34.

The manner in which the apparatus operates is as follows:

The operation is initiated by downwards movement of the carriage 18, under the influence of the piston-and-cylinder device 23. This causes the magazine opening lever 43 to allow the lowermost workpiece to drop out of the magazine 10 and between the star wheels 16 of the loader 4. The chuck 38 of this workpiece contacts the surface 36 of the lever 34, which locates the chuck between the star wheels 16 accurately in relation to the carriage 18. The carriage 18 is then moved down the slide 19 by the piston-and-cylinder device 23, while the cam 21 is pressed against the cam surface 22 by the piston-and-cylinder device 20. When the cam 21 reaches the microswitch 25, the piston-and-cylinder device 20 is actuated to pivot the carriage 18 about the shaft 13, and thereby to feed the chuck 38 into the collet 3 of the lathe. Then, as soon as the cam 21 hits the microswitch 24, the carriage 18 begins to move upwards away from the collect 3 under the influence of the pistion-and-cylinder device 23; and, because the star wheels 16 are free to rotate in the directions indicated, the chuck 38 is released from the star wheels, and remains in the collet of the lathe.

Figure 9B:
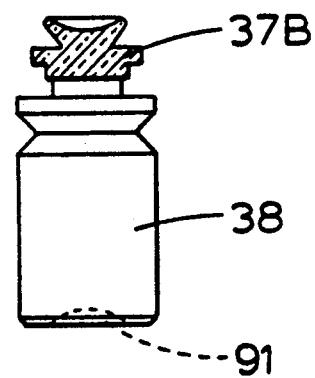

The lens blank 37 carried by the chuck 38 can then be machined. Usually this will involve a first centering cut, followed by a traversing cut to machine the base curve of the lens. A further tool will then plunge in to cut the edge of the lens so that the partly machined lens has the appearance indicated in FIG. 9B. These machining operations are described in British Patent No. 1,488,001. When this has been done, the unloader 5 moves downwardly to grip the chuck 38, and to remove the chuck from the lathe collet 3. The operation of the unloader 5 is identical to that of the loader 4, except that it is in reverse. The unloader 5 includes a magazine similar to the magazine 10; and, when this magazine is full, it can be removed and transferred to another machine, where a subsequent operation (such as edge polishing) is conducted. The edge polishing machine may have automatic loading and unloading mechanisms similar to those described above. The edge polishing machine may comprise a horizontal table arranged to be rotated in stepwise manner between stations. At a loading station, a loading device such as that described later in relation to FIG. 6, but mounted horizontally in a plane adjacent to that of the table is arranged to feed chucks and attached lenses sequentially to holders on the table. When the table indexes to the next station, the edges of the partly machined lens are polished by a rotating pad to which an abrasive suspension is applied. In timed sequence, to correspond with the degree of polishing required, the table indexes once more so that the polished part-machined lens moves to a station where an unloading device is located. This is also arranged in a horizontal plane and is similar to the device of FIG. 6 except that the one-way clutches operate in the opposite direction and no positioning device is necessary.

As soon as the first workpiece has been removed from the lathe collet 3 by the unloader 5, the next workpiece can be removed from the magazine 10 of the loader 4, and the cycle of operations described above can be repeated.

It will be apparent that a number of modifications could be made to the loading and unloading mechanisms described above. For example, the positioning lever 34 could be replaced by a less bulky device. Thus, FIG. 6 shows the loading head 15 provided with a positioning device 34' in place of the lever 34. The loading head 15 is essentially the same as that shown in FIG. 5 apart from the replacement of the positioning lever by the positioning device 34', and the fact that its star wheels 16 are of six-point construction. The positioning device 34' has a stop pin 45 resiliently mounted within a housing 46. The housing 46 is fixed relative to the magazine (not shown in FIG. 6), and the stop pin 45 is positioned so as to contact a side face of one of the points of the left-hand (as shown in FIG. 6) star wheel 16. The device 34' is positioned so as to predetermine accurately the position of a workpiece at the beginning of a loading cycle. Thus, at the beginning of a loading cycle, the loading head 15 is moved to the position shown in FIG. 6, in which the pin 45 contacts a side face of one of the points of the left-hand star wheel 16. The magazine opening lever 43 (not shown in FIG. 6) is then operated to allow the lowermost workpiece to drop out of the magazine and between the star wheels 16. The remainder of the loading cycle is then the same as that described above with reference to the embodiment of FIGS. 1 to 5. The pin 45 is resiliently mounted in its housing 46 in such a manner as to minimise damage if, for any reason, the device 34' is incorrectly positioned, and the pin is subject to excessive force on contacting the star wheel 16.

Although the positioning device 34' of FIG. 6 does require a more complicated setting-up procedure than the positioning lever 34, it has the major advantage of being considerably less bulky than the positioning lever.

In another modification, the proximity switches 24 and 25 of the embodiment of FIGS. 1 to 5 are replaced by an arrangement utilising magnets and sensors. Thus, FIG. 7 shows a modified piston-and-cylinder device 23 whose piston rod 47 is provided with a permanent magnet 48. A sensor 49 is fixed to the cylinder 50 of the device 23. The magnet 48 is positioned in a complementary recess formed in the piston rod 47, so that it is flush with the outer surface of the piston rod. Alternatively, the piston rod 47 may be formed with an annular magnetised zone in place of the magnet 48. The other piston-and-cylinder device 20 (not shown in FIG. 7) is also provided with a magnet (or a magnetised zone) on its piston rod, and with a sensor on its cylinder. The magnets are positioned on their piston rods so that they are sensed by their sensors at the appropriate times in the loading cycle to fulfill the functions of the proximity switches 24 and 25. Thus, when the cam 21 reaches the end of the cam surface 22, the magnet 48 is aligned with the sensor 49, which actuates the piston-and-cylinder device 20. The device 20 then pivots the carriage 18 (see FIG. 2) about the shaft 13, and so feeds the chuck 38 carried by the star wheels 16 to the collet 3 of the lathe. Then, when the magnet and sensor of the device 20 are in alignment (that is to say when the cam 21 reaches the position equivalent to that in which the microswitch 24 of the embodiment of FIGS. 1 to 5 was triggered), the piston-and-cylinder device 23 is actuated to move the carriage 18 upwards and away from the collet 3. As with the embodiment of FIGS. 1 to 5, the chuck 38 is released from the star wheels 16, at this stage, because the star wheels are free to rotate in the directions indicated in FIG. 3.

The sensor 49 may be provided with a delay switch 50 which delays actuation of the piston-and-cylinder device 20 until the cam 21 has moved a short way downwards from the position shown in FIG. 2. This arrangement is advantageous in that it prevents the cam 21 from jamming against the start of the cam surface 22.

In a further modification of the embodiment shown in FIGS. 1 to 5, the loader 4 and the unloader 5 are fixed to the bed of the lathe, and the collet/tool holder assembly is movable. This gives rise to a more stable arrangement.

Figure 9C:
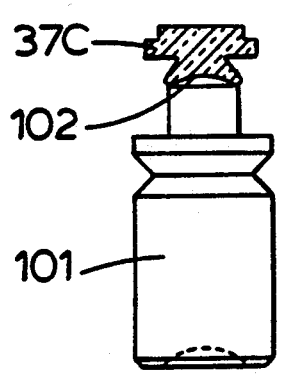

After the partly machined lens (FIG. 9B) has been polished, the lens is transferred to a block 101 similar to chuck 38 except that it has a rounded top 102 for receiving the base curve of the lens (see FIG. 9C). The necessary transfer is effected in a blocking machine in which a chuck and attached part-machined lens is held on top of a heated block to which a blob of hot adhesive wax is applied. When all three components have cooled and are bonded together, the bond between the chuck 38 and the part-machined lens is broken. These operations can be carried out on a machine having an indexing table to which the part-worked lenses are fed from magazines and removed on blocks into magazines, using the same kind of loading and unloading devices as described above in connection with the polishing machine.

Figure 10:
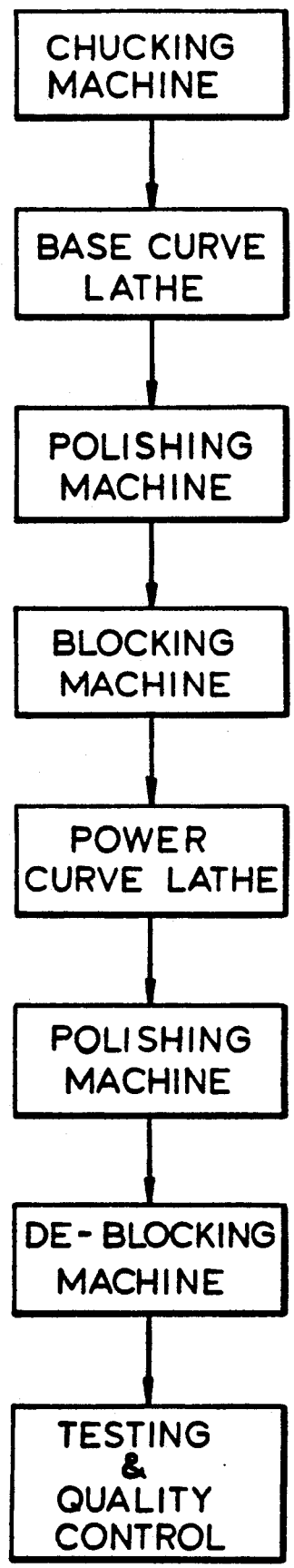
FIG. 10 is a flow diagram indicating the manufacturing operation.

FIG. 10 is a typical flow sheet for manufacturing lenses using machines fitted with the automatic loading and unloading devices of this invention. Pre-formed blanks 37 (see FIG. 9A) are fed to the chucking machine by means of a vibratory feeder and are there bonded by a thermoplastic wax adhesive to a metal chuck 38. The chucking machine comprises a pair of horizontal tables to which the chucks and pre-formed button-shaped blanks are each fed by their respective vibratory feeders. Just before a chuck and blank are brought together a blob of hot wax is applied to the top of the chuck. The resultant workpieces are indexed around the second table until they reach the unloading station, where they are unloaded into a magazine (as shown in FIG. 8) using an automatic unloading device operating horizontally, as previously described.

From the chucking machine the magazines containing workpieces are supplied to the base curve lathe. The lathe operates as already described to produce a partly worked lens 37B having the form indicated in FIG. 9B and are unloaded into magazines after the base curve machining steps. Magazines containing the partly worked lenses and chucks are then passed to a polishing machine where the edges are subjected to a short polishing operation. As previously described similar automatic loading and unloading devices are employed and the partly worked lenses are again unloaded into magazines.

Figure 9D:
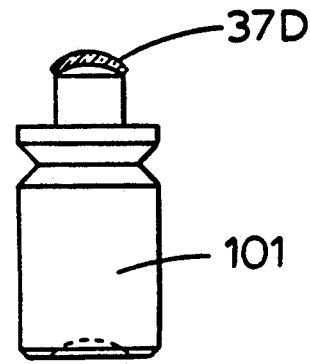

The next operation is the transfer of the partly worked lens to a metal block 101 (see FIG. 9C). This transfer is carried out using a blocking machine as described above. Again the partly-worked lenses (this time bonded the other way round to a metal block) are unloaded into a magazine and sent to a lens lathe, where the front or power curve is cut. The lathe is similar to that already described for cutting the base curve. After this operation, the lens 37D (see FIG. 9D) is sent in a magazine to a second polishing machine from which the lenses and attached blocks are passed in magazines to the de-blocking machine, where the lenses are removed from the blocks by heating the blocks to a temperature at which the wax melts. At this point since the lenses have been separated from their blocks, they are guided individually to a testing and quality control location. If hard lenses are being manufactured, the lenses are then packaged. In the case of soft lenses, the products at this stage are sent to swelling and washing apparatus.

It will be appreciated that a system in which lens blanks or partially machined lenses are contained in a magazine from which the workpieces can be fed to, or accepted from, a machine or apparatus has several advantages. For example, there is no individual handling of the workpieces, either during machining or polishing, or in transporting the workpieces from one machine to another in the different stages of manufacture. At the same time, the use of magazines enables flexibility of production to be achieved, since partially worked lens blanks having, for example, the same base curve dimensions can be fed to different machines for cutting power curves of different sizes. The magazine may be made from metal or plastics material, and may be marked to indicate the characteristics of the workpieces which it contains. This may be achieved magnetically, for example by including a magnetic recording strip attached to the magazine on which the history (and/or the intended dimensions) of the workpiece are recorded. The machines may be provided with magnetic strip reading heads, which are programmed to accept only magazines which contain workpieces appropriate to the particular phase of manufacture.

What is claimed is:

1. An apparatus for manufacturing contact lenses in which workpieces comprising contact lens blanks or partly finished lenses are inserted into a machine tool collet and subjected to a lens forming or polishing operation characterized in that said apparatus comprises:

a loading device arranged at a loading station to remove workpieces sequentially from a first magazine which encloses a plurality of workpieces and to feed the workpieces individually into the collet from the loading station;

said loading device having a first holding means for holding a workpiece removed from the first magazine and a positioning means for positioning said workpiece at the loading station in a predetermined position with respect to the collet;

an unloading device which includes a second holding means for removing workpieces from the collet and for introducing them sequentially into a second magazine, said first holding means is mounted on a carriage which is movable by first and second motion producing devices, said first and second devices being jointly effective to linearly and pivotally move said first holding means from the loading station into a position in which the workpiece is in alignment with the collet, said second device being effective to transfer the workpiece to the machine tool collet, and said first device being effective to move said first holding means away from the collet after the workpiece has been transferred to the collet;

said motion producing devices are arranged substantially at right-angles to each other, and wherein said carriage is provided with a cam which is movable along a cam surface for guiding said first holding means of said loading device from the loading station to the collet; and, said motion producing devices are controlled by first and second proximity switches, said first proximity switch initiating the movement of said first holding means which carries said workpiece from the loading station towards the collet, and said second proximity switch initiating the movement of said first holding means of said loading device away from the collet after said workpiece has been transferred to the collet.

2. The apparatus of claim 1 wherein the workpieces comprise lens blanks or partly finished lens mounted on chucks or blocks and said positioning means is operable to contact the chuck or block.

3. The apparatus of claim 1 further comprising a first magazine which comprises a tubular housing and a releasing means which is operable in conjunction with said loading device for releasing workpieces sequentially from said first magazine.

4. An apparatus for manufacturing contact lenses in which workpieces comprising contact lens blanks or partly finished lenses are inserted into a machine tool collet and subjected to a lens forming or polishing operation characterized in that said apparatus comprises:

a loading device arranged at a loading station to remove workpieces sequentially from a first magazine which encloses a plurality of workpieces and to feed the workpieces individually into the collet from the loading station;

said loading device having a first holding means for holding a workpiece removed from the first magazine and a positioning means for positioning said workpiece at the loading station in a predetermined position with respect to the collet;

an unloading device which includes a second holding means for removing workpieces from the collet and for introducing them sequentially into a second magazine, said first holding means is mounted on a carriage which is movable by first and second motion producing devices, said first and second devices being jointly effective to linearly and pivotally move said first holding means from the loading station into a position in which the workpiece is in alignment with the collet, said second device being effective to transfer the workpiece to the machine tool collet, and said first device being effective to move said first holding means away from the collet after the workpiece has been transferred to the collet; and, each of said motion producing devices has a piston rod, a cylinder and a magnet associated with said piston rod and a sensor associated with said cylinder, said magnets and sensors being so positioned that, when said sensor of said second motion producing device is in alignment with said magnet of said second device, it initiates the movement of said first holding means which carries said workpiece from said position towards the collet, and, when said sensor of said first motion producing device is in alignment with said magnet of said first device, it initiates the movement of said first holding means away from the collet after said workpiece has been transferred to the collet.

5. An apparatus for manufacturing contact lenses in which workpieces comprising contact lens blanks or partly finished lenses are inserted into a machine tool collet and subjected to a lens forming or polishing operation characterized in that said apparatus comprises:

a loading device arranged at a loading station to remove workpieces sequentially from a first magazine which encloses a plurality of workpieces and to feed the workpieces individually into the collet from the loading station;

said loading device having a first holding means for holding a workpiece removed from the first magazine and a positioning means for positioning said workpiece at the loading station in a predetermined position with respect to the collet;

an unloading device which includes a second holding means for removing workpieces from the collet and for introducing them sequentially into a second magazine, said first holding means is mounted on a carriage which is movable by first and second motion producing devices, said first and second devices being jointly effective to linearly and pivotally move said first holding means from the loading station into a position in which the workpiece is in alignment with the collet, said second device being effective to transfer the workpiece to the machine tool collet, and said first device being effective to move said first holding means away from the collet after the workpiece has been transferred to the collet; and, said holding means of an said loading device comprises a pair of star wheels.

6. The apparatus of claim 5 wherein each of said star wheels is rotatably mounted on said loading device by means of a respective one-way clutch, said star wheels being arranged to grip generally cylindrical workpieces as they are released from the magazine.

7. The apparatus of claim 5 wherein said positioning means comprises a positioning lever mounted on said loading device, and said positioning lever has a gauging surface arranged to contact a surface of a workpiece, and thereby to position the workpiece accurately in a predetermined location for engagement by said star wheels.

8. The apparatus of claim 5 wherein said positioning means comprises a device having a stop pin which is arranged to contact one of the side faces of said star wheels, and thereby to position a workpiece in a predetermined location between said star wheels.

9. The apparatus of claim 8 wherein said positioning device is fixed with respect to the magazine.

10. The apparatus of claim 8 wherein said stop pin is resiliently mounted within said positioning device.

11. The apparatus of claim 5 wherein the collet is the collet of a lens lathe and is rotatably mounted in the head stock of the lens lathe.

12. An apparatus for manufacturing contact lenses in which workpieces comprising contact lens blanks or partly finished lenses are inserted into a machine tool collet and subjected to a lens forming or polishing operation characterized in that said apparatus comprises:
- a loading device arranged at a loading station to remove workpieces sequentially from a first magazine which encloses a plurality of workpieces and to feed the workpieces individually into the collet from the loading station;
- said loading device having a first holding means for holding a workpiece removed from the first magazine and a positioning means for positioning said workpiece at the loading station in a predetermined position with respect to the collet;
- an unloading device which includes a second holding means for removing workpieces from the collet and for introducing them sequentially into a second magazine, said first holding means is mounted on a carriage which is movable by first and second motion producing devices, said first and second devices being jointly effective to linearly and pivotally move said first holding means from the loading station into a position in which the workpiece is in alignment with the collet, said second device being effective to transfer the workpiece to the machine tool collet, and said first device being effective to move said first holding means away from the collet after the workpiece has been transferred to the collet; and,
- said holding means on said unloading device comprises a pair of star wheels mounted on said unloading device by means of respective one-way clutches, said star wheels being arranged to grip generally cylindrical workpieces as they are released from the collet and said clutches permitting free rotation of said star wheels.

13. An apparatus for manufacturing contact lenses comprising:
- a first protective magazine for holding and protectively enclosing a plurality of contact lens blanks mounted on a block or chuck,
- a first machine tool for performing a machining operation on a lens blank, and having a first collet,
- a first positioning means for positioning a mounted lens blank unloaded from said first protective magazine at a predetermined location with respect to said first collet,
- said positioning means including a sensing means which contacts a surface of the block or chuck of the mounted lens blank for sensing the position of the unloaded mounted lens blank relative to said first collet,
- a feeding means for feeding the mounted lens blank from said predetermined location into said first collet,
- a second protective magazine for holding and protectively enclosing a plurality of mounted lens blanks after being partly worked by said first machine tool,
- a removing means for removing the lens blank after being partly-worked by said first machine tool from said first collet and positioning the partly-worked mounted lens blank in said second protective magazine,
- a second machine tool for performing a machining operation on a partly-worked lens blank, and having a second collet,
- a transferring means for transferring said second protective magazine with the partly-worked mounted lens blank held therein to the general area of said second machine tool,
- a second positioning means for positioning the partly-worked lens blank unloaded from said second protective magazine into said second collet, and
- wherein said first positioning means comprises a pair of star wheels forming jaws into which the mounted lens blank is positioned, and a rotating means for rotating said pair of star wheels.

14. An apparatus for manufacturing contact lenses comprising:
- a first protective magazine for holding and protectively enclosing a plurality of contact lens blanks mounted on a block or chuck,
- a first machine tool for performing a machining operation on a lens blank, and having a first collet,
- a first positioning means for positioning a mounted lens blank unloaded from said first protective magazine at a predetermined location with respect to said first collet,
- said positioning means including a sensing means which contacts a surface of the block or chuck of the mounted lens blank for sensing the position of the unloaded mounted lens blank relative to said first collet,
- a feeding means for feeding the mounted lens blank from said predetermined location into said first collet,
- a second protective magazine for holding and protectively enclosing a plurality of mounted lens blanks after being partly worked by said first machine tool,
- a removing means for removing the lens blank after being partly-worked by said first machine tool from said first collet and positioning the partly-worked mounted lens blank in said second protective magazine,
- a second machine tool for performing a machining operation on a partly-worked lens blank, and having a second collet,
- a transferring means for transferring said second protective magazine with the partly-worked mounted lens blank held therein to the general area of said second machine tool, and
- a second positioning means for positioning the partly-worked lens blank unloaded from said second protective magazine into said second collet,
- said first positioning means comprises a pair of star wheels forming jaws into which the mounted lens blank is positioned, and a rotating means for rotating said pair of star wheels.

* * * * *